United States Patent
Cohen et al.

(10) Patent No.: US 8,125,896 B2
(45) Date of Patent: Feb. 28, 2012

(54) INDIVIDUALIZING A CONNECTIVITY-INDICATIVE MAPPING

(75) Inventors: Alexander J. Cohen, Mill Valley, CA (US); Edward K. Y. Jung, Bellevue, WA (US); Royce A Levien, Lexington, MA (US); Robert W. Lord, Seattle, WA (US); Mark A Malamud, Seattle, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1023 days.

(21) Appl. No.: 11/262,304

(22) Filed: Oct. 28, 2005

(65) Prior Publication Data

US 2007/0116017 A1 May 24, 2007

Related U.S. Application Data

(63) Continuation-in-part of application No. 11/252,258, filed on Oct. 17, 2005, now Pat. No. 8,111,622, and a continuation-in-part of application No. 11/252,206, filed on Oct. 17, 2005, and a continuation-in-part of application No. 11/252,205, filed on Oct. 17, 2005, now Pat. No. 7,646,712.

(51) Int. Cl.
*H04J 1/16* (2006.01)

(52) U.S. Cl. .................. 370/229; 455/456.3; 455/456.1; 701/201

(58) Field of Classification Search .................. 370/229, 370/236; 701/201; 455/456.3, 456.1
See application file for complete search history.

(56) References Cited

U.S. PATENT DOCUMENTS

| | | | |
|---|---|---|---|
| 4,742,516 A | 5/1988 | Yamaguchi | |
| 5,583,869 A | 12/1996 | Grube et al. | |
| 5,870,391 A | 2/1999 | Nago | |
| 6,049,549 A | 4/2000 | Ganz et al. | |
| 6,128,327 A | 10/2000 | Bird et al. | |
| 6,198,765 B1 | 3/2001 | Cahn et al. | |
| 6,272,117 B1 | 8/2001 | Choi et al. | |
| 6,429,771 B1 | 8/2002 | Dorenbosch et al. | |
| 6,504,833 B1 | 1/2003 | Ishii et al. | |
| 6,535,498 B1 | 3/2003 | Larsson et al. | |
| 6,728,215 B1 | 4/2004 | Alperovich et al. | |
| 6,771,633 B1 | 8/2004 | Mizoguchi | |
| 6,775,707 B1 | 8/2004 | Bennett et al. | |
| 6,810,257 B1 | 10/2004 | Amin | |
| 6,870,487 B2 | 3/2005 | Nuesser et al. | |
| 6,885,637 B1 | 4/2005 | Shvodian | |

(Continued)

FOREIGN PATENT DOCUMENTS

DE 19733586 C1 2/1999

(Continued)

OTHER PUBLICATIONS

U.S. Appl. No. 11/396,367, Cohen et al.

(Continued)

*Primary Examiner* — Phuoc Doan

(57) ABSTRACT

A method, device, and computer program product are described for obtaining a connectivity evaluation with an associated location of a first individualized node and for aggregating an indicator of a first location, an indicator of a second location, a first connectivity evaluation, and a second connectivity evaluation into an individualized connectivity-indicative mapping for the first individualized node.

76 Claims, 10 Drawing Sheets

U.S. PATENT DOCUMENTS

| | | |
|---|---|---|
| 6,885,877 B1 | 4/2005 | Ozaki et al. |
| 6,957,077 B2 | 10/2005 | Dehlin |
| 6,980,524 B1 | 12/2005 | Lu et al. |
| 7,024,782 B1 | 4/2006 | Bork |
| 7,062,279 B2 | 6/2006 | Cedervall et al. |
| 7,072,977 B1 | 7/2006 | Bernard et al. |
| 7,149,537 B1 | 12/2006 | Kupsh et al. |
| 7,617,042 B2 | 11/2009 | Horvitz et al. |
| 2001/0022558 A1 | 9/2001 | Karr, Jr. et al. |
| 2002/0044549 A1 | 4/2002 | Johansson et al. |
| 2002/0061744 A1 | 5/2002 | Hamalainen et al. |
| 2002/0075941 A1 | 6/2002 | Souissi et al. |
| 2002/0077151 A1 | 6/2002 | Matthews et al. |
| 2002/0122410 A1 | 9/2002 | Kulikov et al. |
| 2002/0198005 A1 | 12/2002 | Hilton et al. |
| 2003/0007473 A1 | 1/2003 | Strong et al. |
| 2003/0033394 A1 | 2/2003 | Stine |
| 2003/0053424 A1 | 3/2003 | Krishnamurthy et al. |
| 2003/0072306 A1 | 4/2003 | Hunzinger |
| 2003/0100317 A1 | 5/2003 | Kaplan et al. |
| 2003/0125067 A1 | 7/2003 | Takeda et al. |
| 2003/0146871 A1 | 8/2003 | Karr et al. |
| 2003/0156058 A1 | 8/2003 | Edwards et al. |
| 2003/0199275 A1 | 10/2003 | Sakoda et al. |
| 2003/0202468 A1* | 10/2003 | Cain et al. .............. 370/229 |
| 2003/0202476 A1 | 10/2003 | Billhartz et al. |
| 2003/0224840 A1 | 12/2003 | Frank et al. |
| 2003/0229900 A1 | 12/2003 | Reisman |
| 2004/0009794 A1 | 1/2004 | Proctor, Jr. et al. |
| 2004/0058678 A1 | 3/2004 | deTorbal |
| 2004/0093426 A1 | 5/2004 | Sahasrabudhe et al. |
| 2004/0124977 A1 | 7/2004 | Biffar |
| 2004/0125776 A1 | 7/2004 | Haugli et al. |
| 2004/0147223 A1 | 7/2004 | Cho |
| 2004/0156355 A1* | 8/2004 | Stumpert .............. 370/352 |
| 2004/0157549 A1 | 8/2004 | Dold et al. |
| 2004/0160943 A1 | 8/2004 | Cain |
| 2004/0190447 A1 | 9/2004 | Dacosta |
| 2004/0192353 A1 | 9/2004 | Mason et al. |
| 2004/0196834 A1 | 10/2004 | Ofek et al. |
| 2004/0203380 A1 | 10/2004 | Hamdi et al. |
| 2004/0203435 A1 | 10/2004 | Karlquist et al. |
| 2004/0203718 A1 | 10/2004 | Knauerhase et al. |
| 2004/0203779 A1 | 10/2004 | Gabara |
| 2004/0203820 A1 | 10/2004 | Billhartz |
| 2004/0203855 A1 | 10/2004 | Veerasamy et al. |
| 2004/0213181 A1 | 10/2004 | Grech et al. |
| 2004/0213231 A1 | 10/2004 | Cho et al. |
| 2004/0215373 A1 | 10/2004 | Won et al. |
| 2004/0218605 A1 | 11/2004 | Gustafsson et al. |
| 2004/0219909 A1 | 11/2004 | Kennedy et al. |
| 2004/0233840 A1 | 11/2004 | Bye |
| 2004/0233855 A1 | 11/2004 | Gutierrez et al. |
| 2004/0246144 A1 | 12/2004 | Siegel et al. |
| 2004/0266457 A1 | 12/2004 | Dupray |
| 2005/0014464 A1 | 1/2005 | Larsson |
| 2005/0030921 A1 | 2/2005 | Yau |
| 2005/0050219 A1 | 3/2005 | Choi et al. |
| 2005/0054346 A1 | 3/2005 | Windham et al. |
| 2005/0075119 A1 | 4/2005 | Sheha et al. |
| 2005/0090201 A1 | 4/2005 | Lengies et al. |
| 2005/0128995 A1 | 6/2005 | Ott et al. |
| 2005/0143005 A1 | 6/2005 | Moore, III |
| 2005/0169238 A1 | 8/2005 | Yang et al. |
| 2005/0190717 A1 | 9/2005 | Shu et al. |
| 2005/0192056 A1 | 9/2005 | Karaki |
| 2005/0215234 A1 | 9/2005 | Fukuzawa et al. |
| 2006/0057974 A1 | 3/2006 | Ziarno et al. |
| 2006/0089157 A1* | 4/2006 | Casey et al. ............. 455/456.3 |
| 2006/0126524 A1 | 6/2006 | Tateson |
| 2006/0187847 A1 | 8/2006 | Pelton et al. |
| 2007/0030832 A1* | 2/2007 | Gonia et al. ............. 370/338 |
| 2007/0054617 A1 | 3/2007 | Nikolajevic et al. |
| 2007/0087758 A1 | 4/2007 | Norris et al. |
| 2007/0274268 A1 | 11/2007 | Axelsson et al. |

FOREIGN PATENT DOCUMENTS

| | | |
|---|---|---|
| DE | 19849294 A1 | 4/2000 |
| WO | WO 99/46899 | 9/1999 |

OTHER PUBLICATIONS

Aloi, Daniel N.; Dessert, Patrick E.; Willer, Mike; Fay, Luke; Ronning, Matt; "GPS Car Talk"; GPS World; bearing a date of Sep. 1, 2003; 1-7; pp. 1-7; with additional figures and tables pp. 1-4; located at: http://www.gpsworld.com/gpsworld/article/articleDetail.jsp?id=68463; printed on Sep. 1, 2005.

Ko, Young-Bae; Vaidya, Nitin H.; "Location-Aided Routing (LAR) in mobile ad hoc networks"; Wireless Networks; 2000; vol. 6; pp. 307-321; J.C. Baltzer AG, Science Publishers.

U.S. Appl. No. 12/592,158, Cohen et al.

* cited by examiner

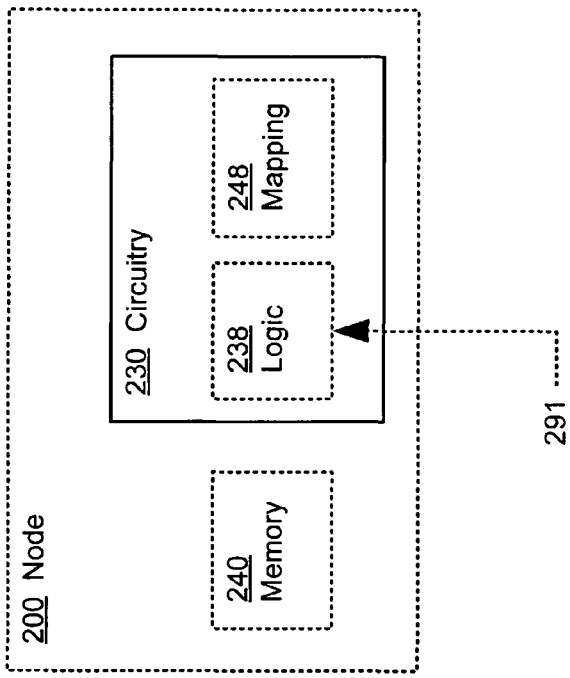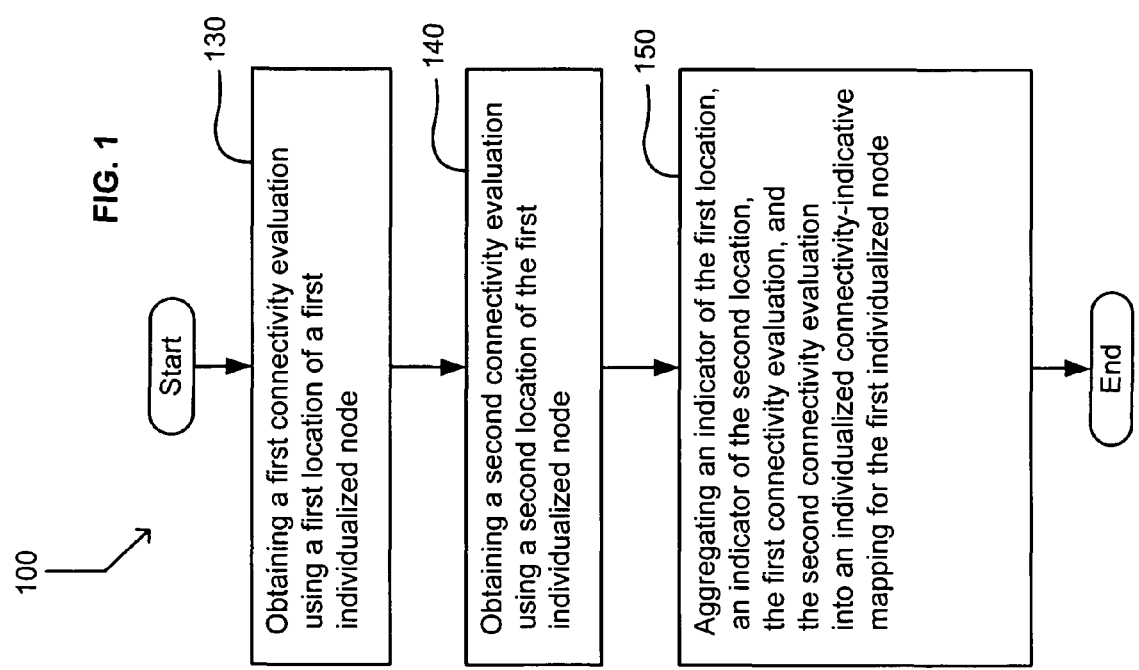

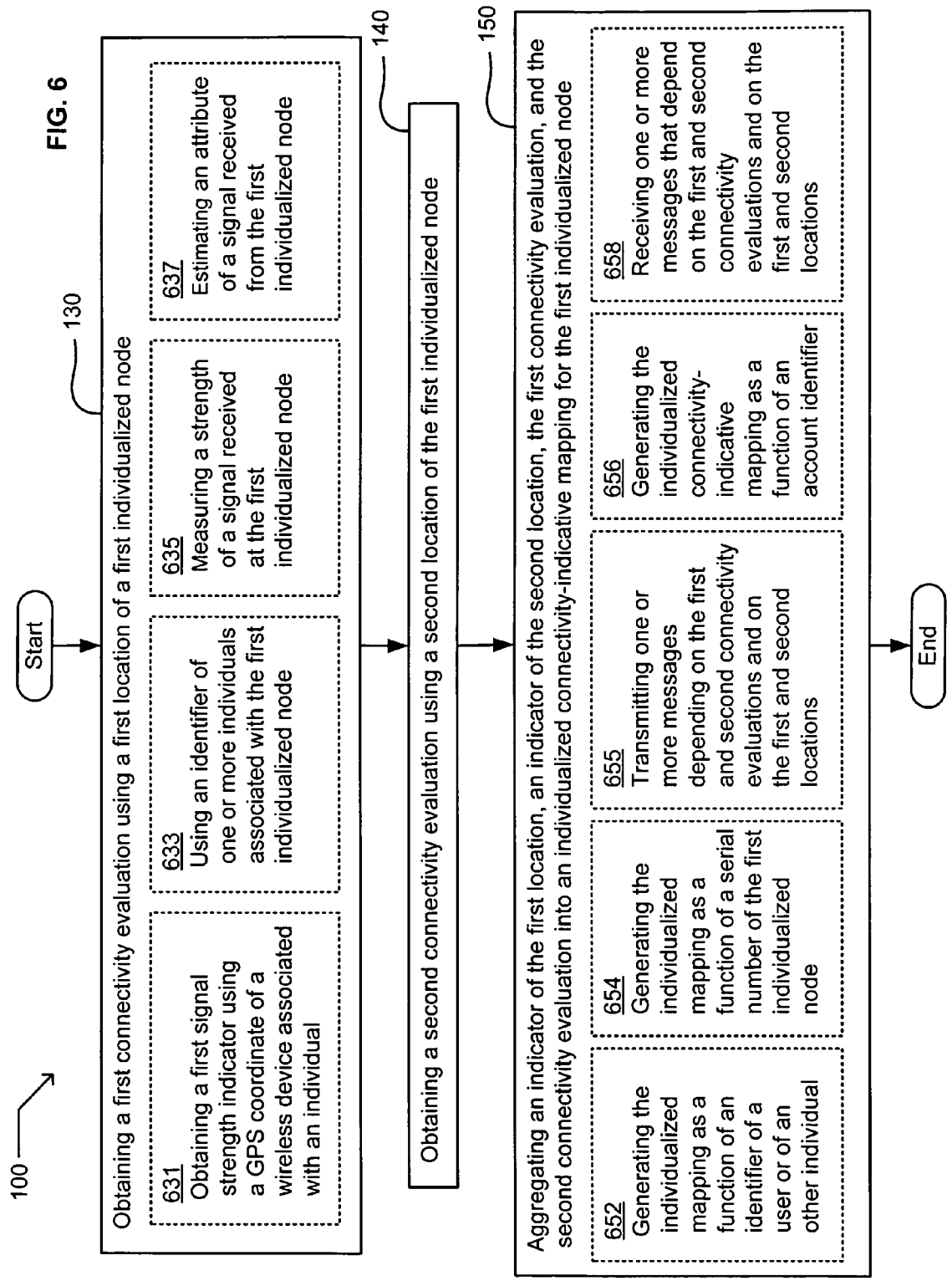

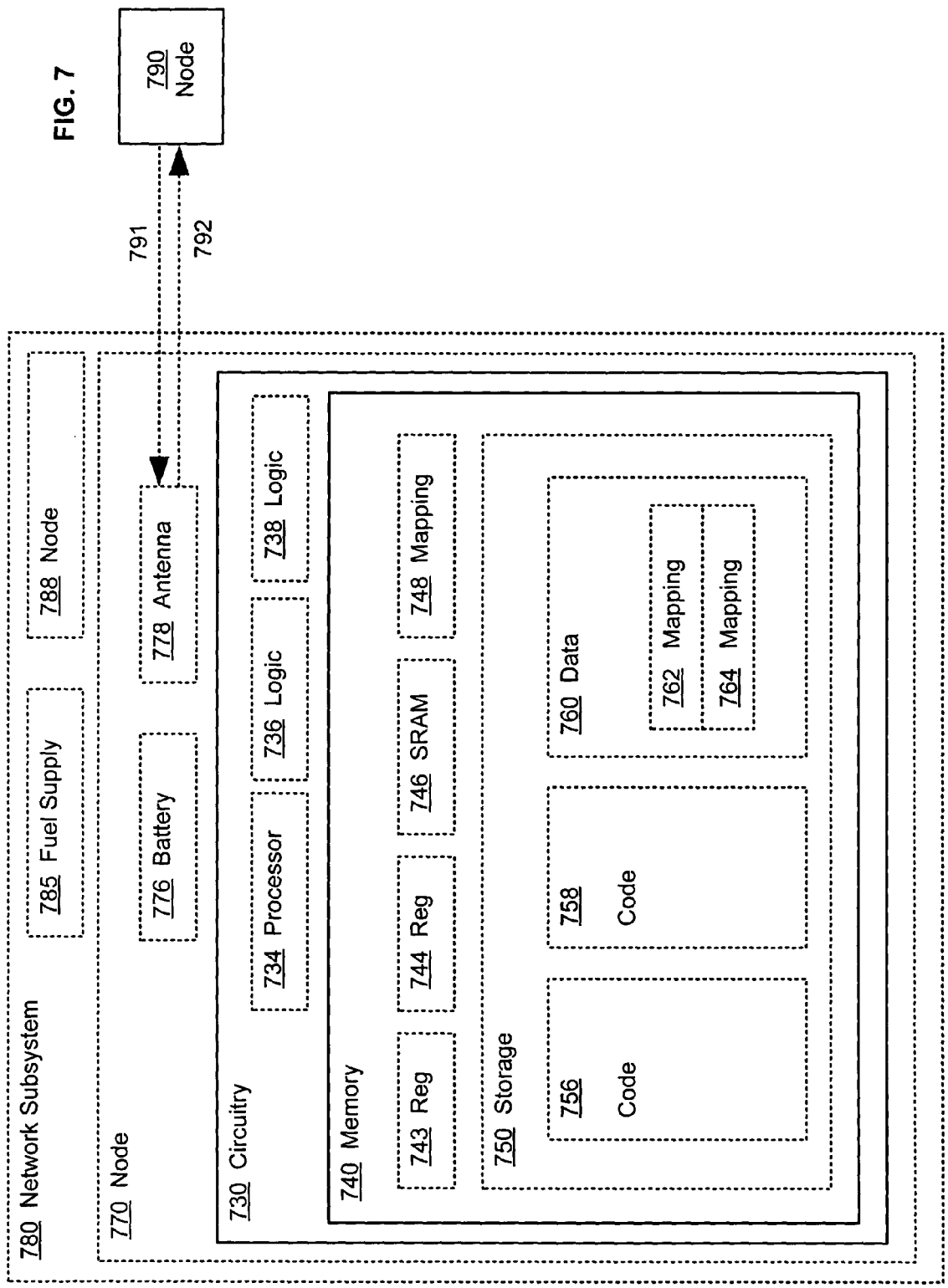

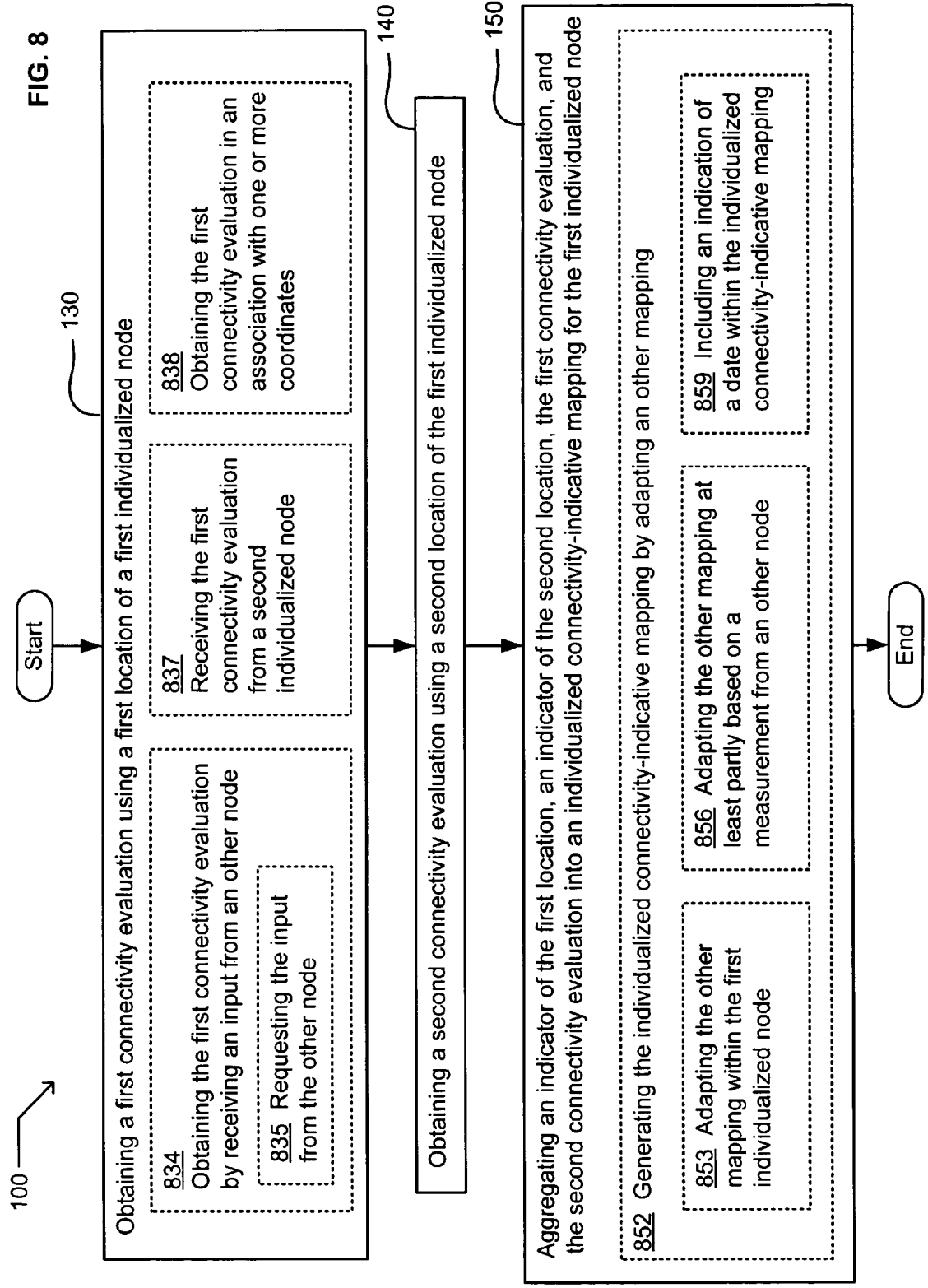

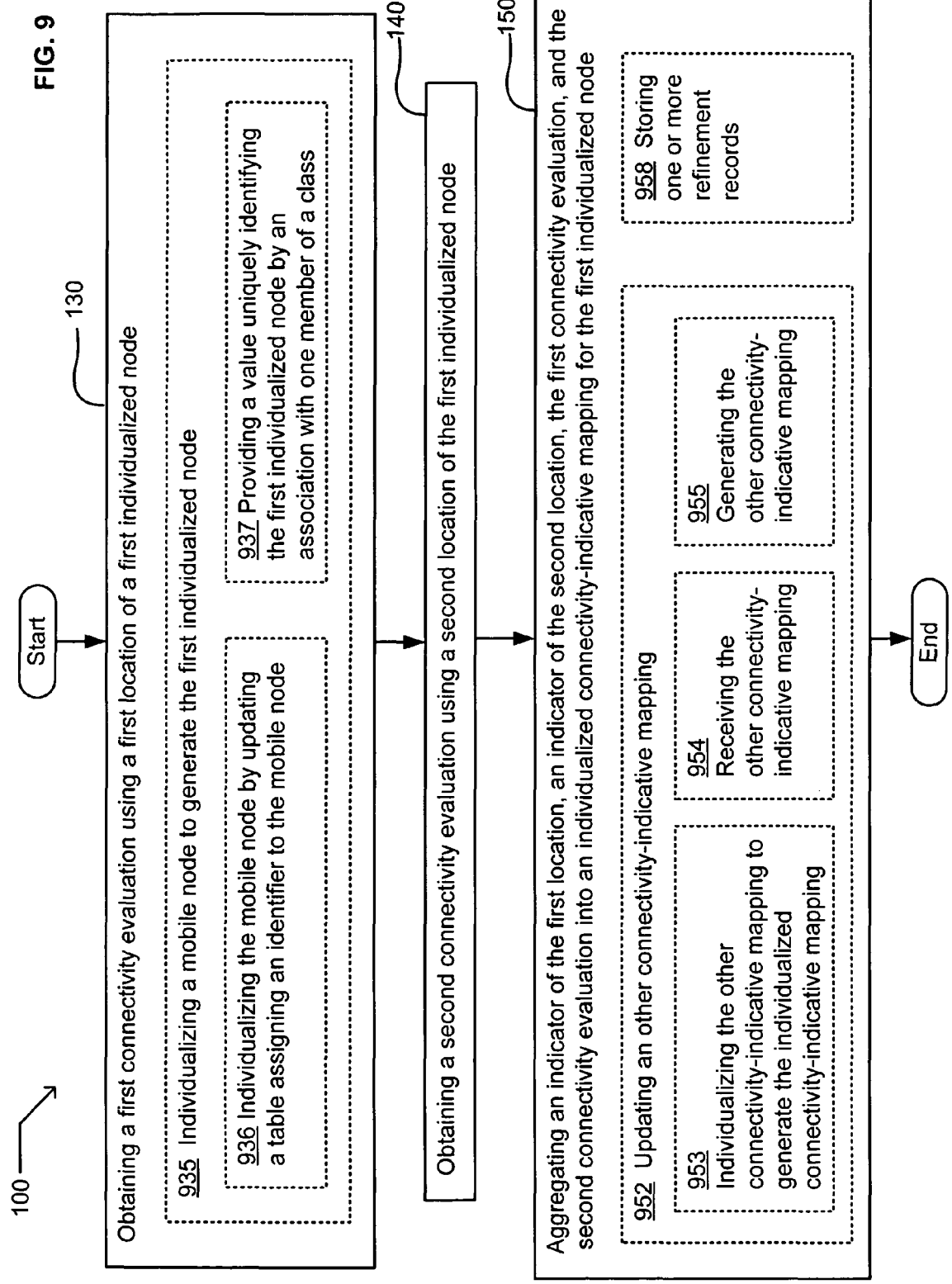

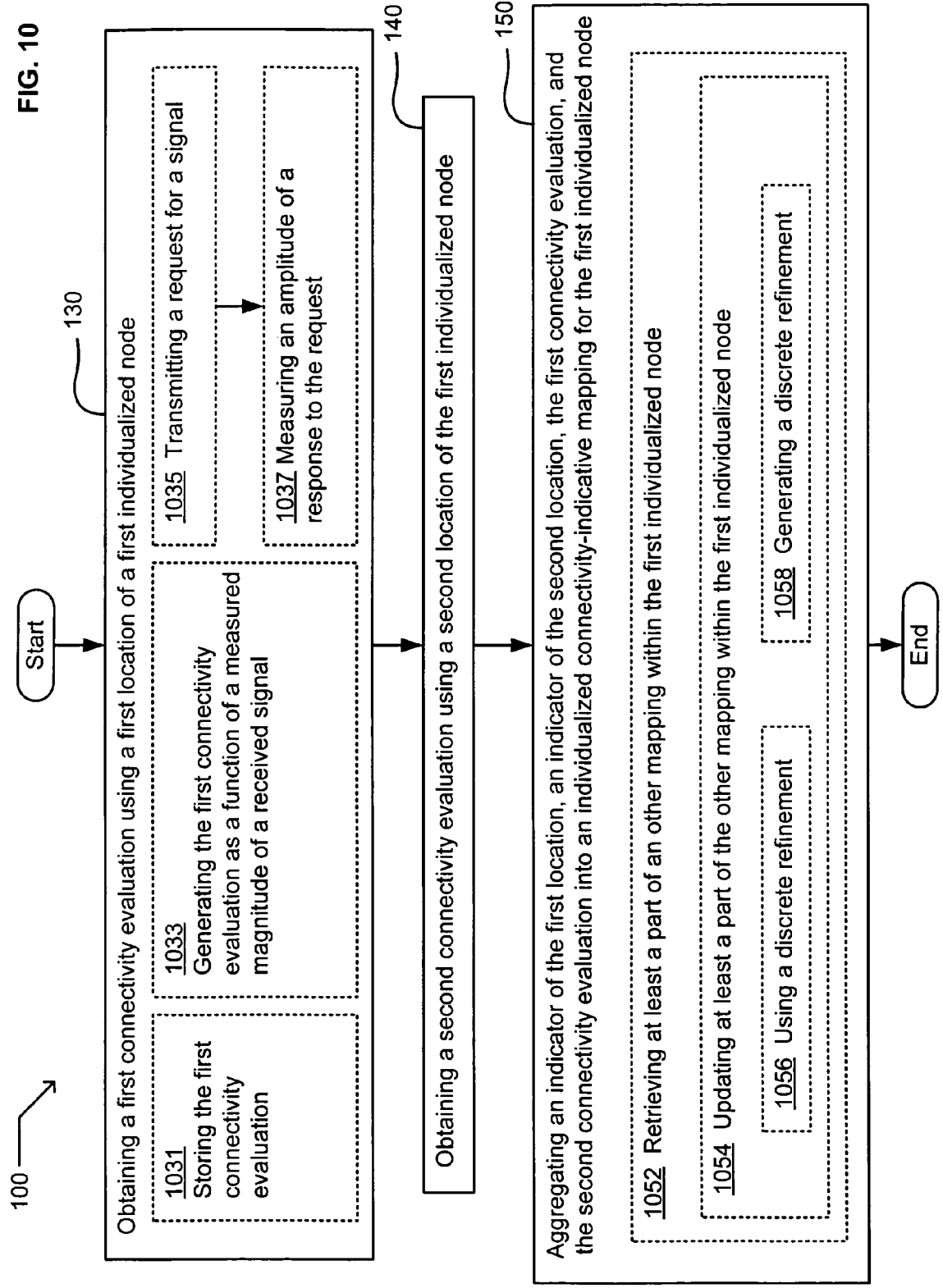

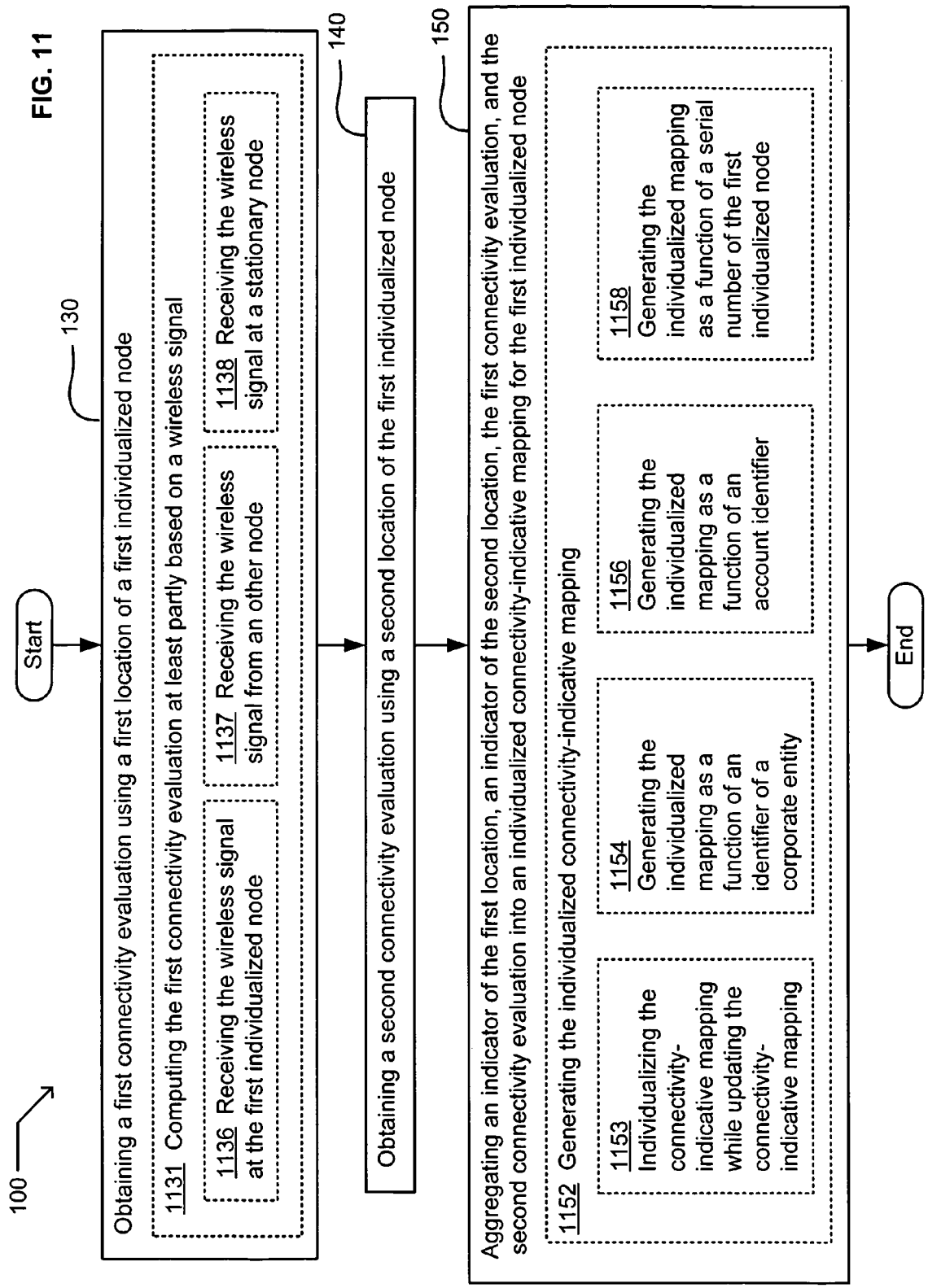

INDIVIDUALIZING A CONNECTIVITY-INDICATIVE MAPPING

RELATED APPLICATIONS

1. For purposes of the USPTO extra-statutory requirements, the present application constitutes a continuation-in-part of United States patent application entitled SIGNAL ROUTING DEPENDENT ON A NODE SPEED CHANGE PREDICTION, naming Alexander J. Cohen; Edward K. Y. Jung; Robert W. Lord; John D. Rinaldo, Jr.; and Clarence T. Tegreene as inventors, U.S. application Ser. No. 11/252,258, filed Oct. 17, 2005 now U.S. Pat. No. 8,111,622.

2. For purposes of the USPTO extra-statutory requirements, the present application constitutes a continuation-in-part of United States patent application entitled SIGNAL ROUTING DEPENDENT ON A LOADING INDICATOR OF A MOBILE NODE, naming Alexander J. Cohen; Edward K. Y. Jung; Robert W. Lord; John D. Rinaldo, Jr.; and Clarence T. Tegreene as inventors, U.S. application Ser. No. 11/252,206, filed Oct. 17, 2005.

3. For purposes of the USPTO extra-statutory requirements, the present application constitutes a continuation-in-part of United States patent application entitled USING A SIGNAL ROUTE DEPENDENT ON A NODE SPEED CHANGE PREDICTION, naming Alexander J. Cohen; Edward K. Y. Jung; Robert W. Lord; John D. Rinaldo, Jr.; and Clarence T. Tegreene as inventors, U.S. application Ser. No. 11/252,205, filed Oct. 17, 2005 now U.S. Pat. No. 7,646,712.

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. Stephen G. Kunin, Benefit of Prior-Filed Application, USPTO Electronic Official Gazette, Mar. 18, 2003 at http://www.uspto.gov/web/offices/com/sol/og/2003/week11/patbene.htm. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

SUMMARY

An embodiment provides a communication method. In one implementation, the method includes but is not limited to obtaining a first connectivity evaluation using a first location of a first individualized node, obtaining a second connectivity evaluation using a second location of the first individualized node, and aggregating an indicator of the first location, an indicator of the second location, the first connectivity evaluation, and the second connectivity evaluation into an individualized connectivity-indicative mapping for the first individualized node. In addition to the foregoing, other communication method aspects are described in the claims, drawings, and text forming a part of the present disclosure.

In one or more various aspects, related systems include but are not limited to circuitry and/or programming for effecting the herein referenced method aspects; the circuitry and/or programming can be virtually any combination of hardware, software, and/or firmware configured to effect the herein-referenced method aspects depending upon the design choices of the system designer.

An embodiment provides a computer program product. In one implementation, the computer program product includes but is not limited to a signal-bearing medium bearing at least one of one or more instructions for obtaining a connectivity evaluation with an associated location of a first individualized node and one or more instructions for aggregating an indicator of a first location, an indicator of a second location, a first connectivity evaluation, and a second connectivity evaluation into an individualized connectivity-indicative mapping for the first individualized node. In addition to the foregoing, other computer program product aspects are described in the claims, drawings, and text forming a part of the present disclosure.

In addition to the foregoing, various other embodiments are set forth and described in the text (e.g., claims and/or detailed description) and/or drawings of the present description.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein, as defined by the claims, will become apparent in the detailed description set forth herein.

BRIEF DESCRIPTION OF THE FIGURES

FIG. 1 shows an operational flow representing example operations that produce a connectivity-indicative mapping.

FIG. 2 shows in schematic form a node having circuitry and memory for performing the operational flow of FIG. 1.

FIG. 6 shows variants of the operational flow of FIG. 1 that can be performed by at least one node of FIG. 5.

FIG. 7 shows circuitry for performing the flow of FIG. 1 and its variants.

FIG. 8 shows variants of the operational flows of FIG. 1 or FIG. 6 that can be performed, for example, by one or more nodes of FIG. 1 or FIG. 5 or by a network subsystem of FIG. 7.

FIG. 9 shows additional variants of the operational flows of FIG. 1, FIG. 6, or FIG. 8.

FIG. 10 shows other variants of the operational flows of FIG. 1, FIG. 6, FIG. 8, or FIG. 9.

FIG. 11 shows further variants of the operational flows of FIG. 1, FIG. 6, FIG. 8, FIG. 9, or FIG. 10.

DETAILED DESCRIPTION

Figure 3:
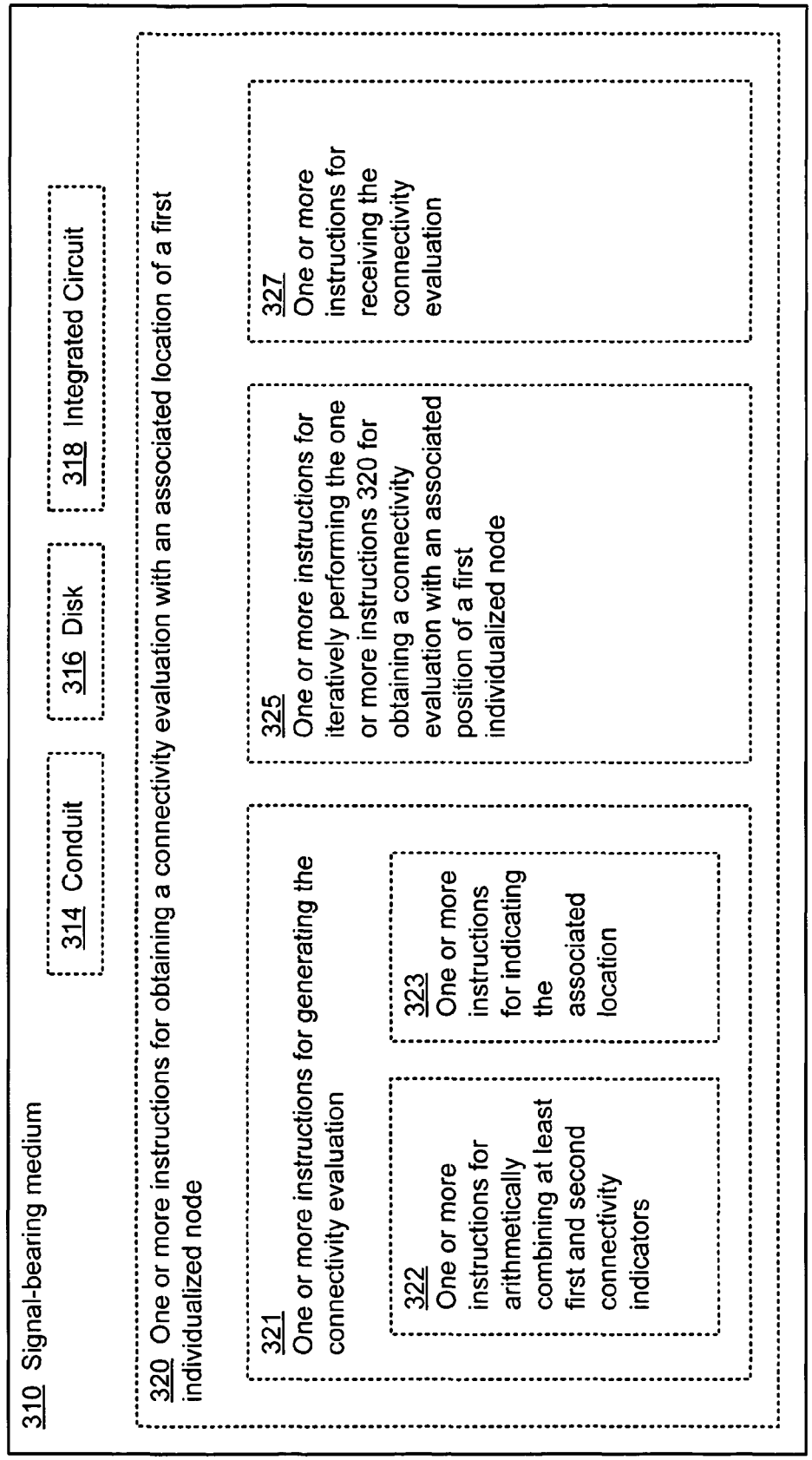
FIG. 3 shows in schematic form a computer program product including a signal bearing medium such as a conduit, a disk, or an integrated circuit.

FIG. 1 shows an operational flow 100 representing example operations that produce a connectivity-indicative mapping in a system such as that of FIG. 2. After a start operation, the operational flow 100 moves to an obtaining operation 130 of obtaining a first connectivity evaluation using a first location of a first individualized node and an operation 140 of obtaining a second connectivity evaluation using a second location of the first individualized node. The individualized node may be a telephone, a vehicle, a computing or communication device, portable medical equipment, a satellite, or any other portable system or component associated with one or more digital identifiers effective for identifying a single class member or individual system. Individualized nodes are commercially available for almost every application incorporating electronics. Almost any system can include a component that can be individualized, moreover, such as by creating or using an identifier that is unique to a given node within a given network.

Operational flow 100 further includes an operation 150 of aggregating an indicator of the first location, an indicator of the second location, the first connectivity evaluation, and the second connectivity evaluation into an individualized connectivity-indicative mapping for the first individualized node. Mapping 248 of FIG. 2 can contain the individualized connectivity-indicative mapping following aggregation operation 150, or the resulting mapping can reside elsewhere. Variations in this order are generally workable. For example, flow 100 can be modified by adding the first location indicator and connectivity evaluation to a table (as aggregating operation 150, e.g.) before beginning operation 140.

Referring now to FIG. 2, there is shown in schematic form a node 200 having at least circuitry 230 and memory 240 for performing operational flow 100. For example, operations 130 and 140 can be performed by logic 238 for obtaining a first connectivity evaluation using a first location of a first individualized node and obtaining a second connectivity evaluation using a second location of the first individualized node of circuitry 230. Logic 238 can perform these operations sequentially, iteratively, simultaneously, overlappingly, in reverse order, or in other ways as described below. The first or second connectivity evaluations can be obtained, for example, by being retrieved from memory 240 or from mapping 248 into memory 240. Also one or more of the connectivity evaluations can be received from outside node 200 or generated by logic 238 based on one or more measurements of an electronic, optical or physical parameter, for example, as an input 291 from outside node 200 to logic 238.

Mapping 248 may be individualized in an initial condition or created in a generic condition and individualized in a later operation. Alternatively or additionally, mapping 248 may be individualized in a series of stages, such as by sifting a multi-class mapping by a single node class and region. For example, a variant of flow 100 can exclude records relating to one or more locations outside a target region. The series of stages can further include arranging the configured sifted mapping with a most relevant mapping portion first. Alternatively, mapping 248 may be individualized a priori, rather than as a part of flow 100.

Referring now to FIG. 3, there is shown in schematic form a computer program product 300 comprising a signal bearing medium 310 such as a conduit 314, a disk 316, or an integrated circuit 318. Signal-bearing medium 310 bears one or more instructions 320 for obtaining a connectivity evaluation with an associated location of a first individualized node such as node 200 of FIG. 2. Node 200 can optionally be configured to include signal-bearing medium 310, for example, as memory 240 or otherwise as an element of node 200.

One or more instructions 320 can include one or more of three optional modules of code as shown in FIG. 3. The first module includes one or more instructions 321 for generating the connectivity evaluation. The one or more instructions 321 can include one or more instructions 322 for arithmetically combining at least first and second connectivity indicators or one or more instructions 323 for indicating the associated location.

The second optional module includes one or more instructions 325 for iteratively performing the one or more instructions for obtaining a connectivity evaluation with an associated position of the first individualized node. The connectivity evaluations can be used iteratively or in batches for updating a mapping or generating refinements, optionally in real time upon a request for a mapping.

The third optional module includes one or more instructions 327 for receiving the connectivity evaluation, reducing a load on local computing resources.

Figure 4:
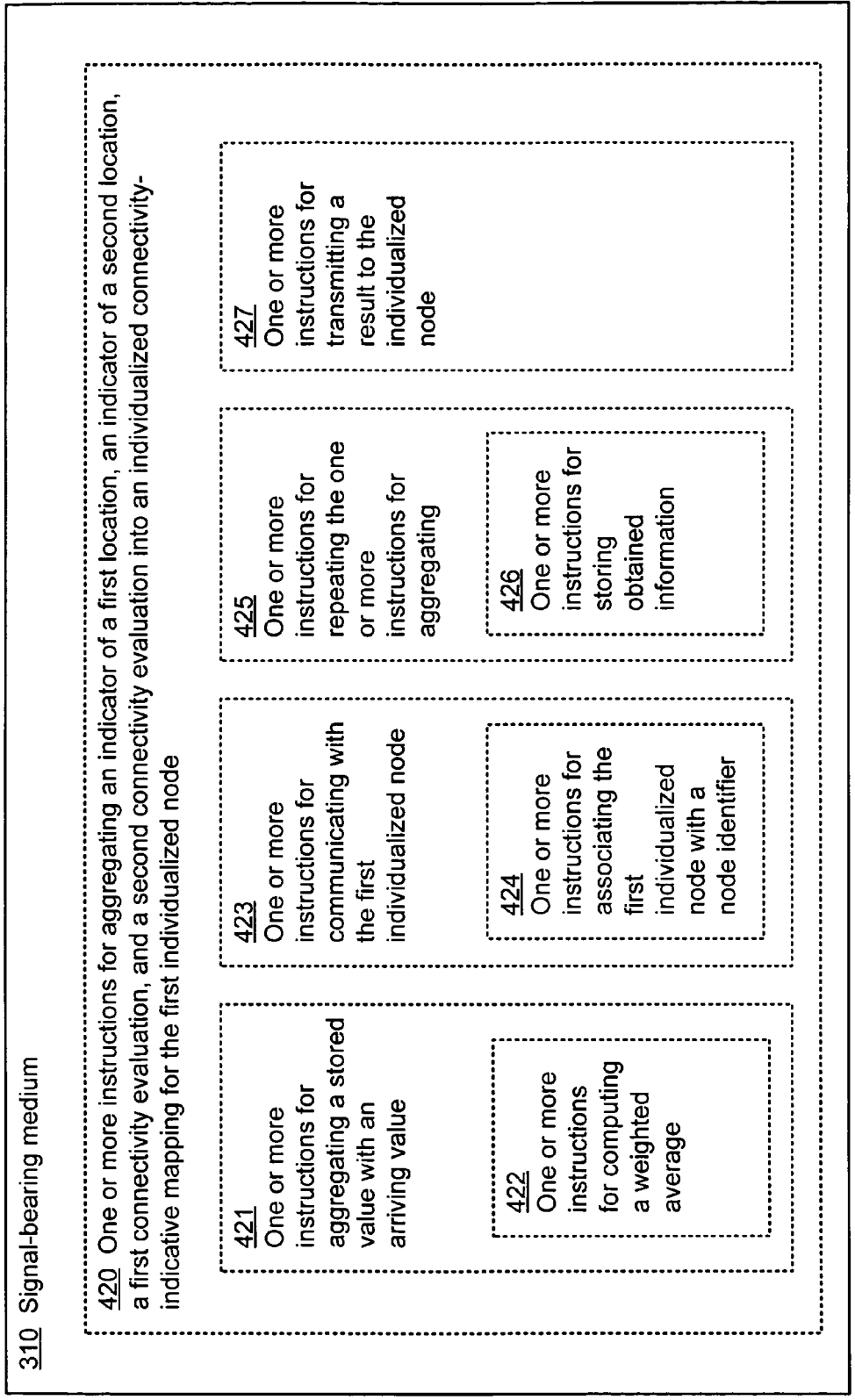
FIG. 4 shows in schematic form additional optional features of the computer program product of FIG. 3.

Referring now to FIG. 4, there is shown in schematic form additional optional features of computer program product 300 of FIG. 3. The (same) signal-bearing medium 310 can bear one or more instructions 420 for aggregating an indicator of a first location, an indicator of a second location, a first connectivity evaluation, and a second connectivity evaluation into an individualized connectivity-indicative mapping for the first individualized node. The one or more instructions 420 can include one of four optional modules of code as shown in FIG. 4.

The first module includes one or more instructions 421 for aggregating a stored value with an arriving value, optionally including one or more instructions 422 for computing a weighted average. For example, a stored value of 5.0 can be given a weight of 80% and combined with arriving values of 3.1 and 2.9 each given a weight of 10%, yielding a computed weighted average of 0.8*5.0+0.1*3.1+0.1*2.9=4.6. Those skilled in the art can readily implement any of numerous variations on computational and similar digital aggregations.

The second module includes one or more instructions 423 for communicating with the first individualized node, optionally including one or more instructions 424 for associating the first individualized node with a node identifier.

The third module includes one or more instructions 425 for repeating the one or more instructions for aggregating, such as by obtaining a respective connectivity evaluation for the first individualized node at each of several locations. The one or more instructions 425 optionally includes one or more instructions 426 for storing obtained information, another mode of aggregation that can be used with or in lieu of arithmetic. For example, in a first iteration of one or more instructions 420, a first and second connectivity evaluation of a given node can be recorded, each with a respective location indicator. Later, in a second iteration of one or more instructions 420, a third and fourth connectivity evaluation of the given node can be recorded, each with a respective location indicator. When in a position accessible for use in the individualized mapping, for example, the four evaluations and the location indicators collectively exemplify an aggregation by repetition.

The fourth module includes one or more instructions 427 for transmitting a result to the individualized node, uses for which are described in several instances below.

Figure 5:
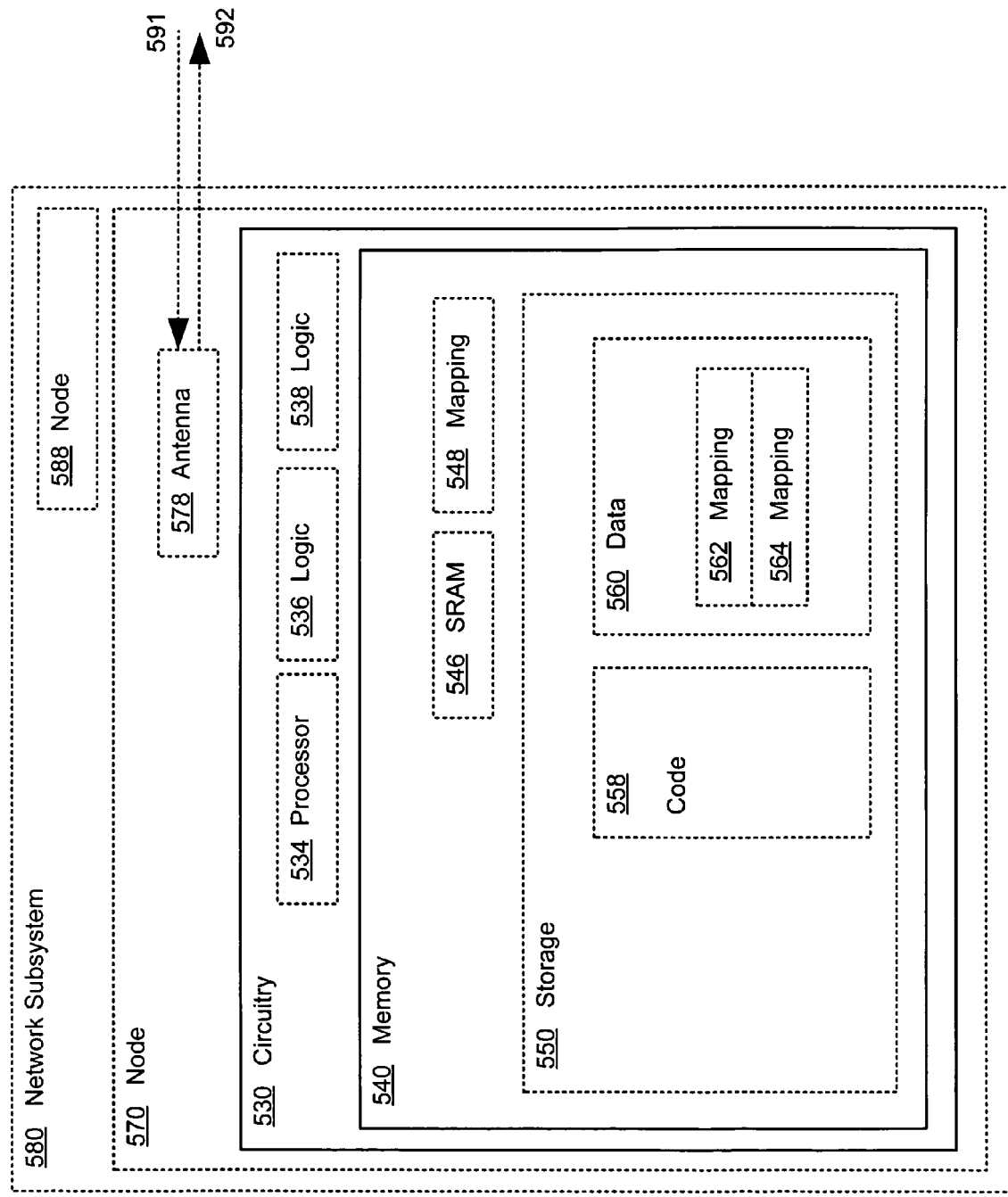
FIG. 5 shows circuitry for performing the flow of FIG. 1.

Turning now to FIG. 5, there is shown circuitry 530 operable to perform flow 100 of FIG. 1. Circuitry 530 can optionally be implemented within node 570, which can include antenna 578. Antenna 578 may be operable for receiving an input 591 or transmitting an output 592. Node 570 can optionally be included within network subsystem 580, which can also include node 588.

Circuitry 530 includes memory 540, and optionally includes one or more of processor 534, logic 536, or logic 538. Memory 540 optionally includes one or more of static random access memory (SRAM) 546, mapping 548, or storage 550. Storage 550 optionally includes one or more data storage discs, chips, or other media containing one or more of code 558 or data 560. Data 560 optionally includes one or more of mapping 562 or mapping 564, one or more of which may include an identification of or other association with a specific node by which a portion thereof was obtained.

In an embodiment in which node 570 implements a mapping server, for example, storage 550 can include data 560 pertaining to a class of nodes. Data 560 optionally includes a first individualized connectivity-indicative mapping 562 for a first node as well as a second individualized connectivity-indicative mapping 564 for a second node. Data 560 optionally includes non-mapping data as well as the one or more mappings 562, 564. Optionally one or more mappings 562 of data 560 overlap with another mapping 564 of data 560.

Turning now to FIG. 6, there are shown alternative embodiments of the example operational flow 100 of FIG. 1 that can be performed by node 570 of FIG. 5. FIG. 6 illustrates example embodiments where operation 130 or operation 150 of flow 100 may include one or more additional operations. Additional operations of operation 130 may include one or more of operation 631, operation 633, operation 635, or operation 637. Additional operations of operation 150 may include one or more of operation 652, operation 654, operation 655, operation 656, or operation 658.

Optional operation 631 includes obtaining a first signal strength indicator using a global positioning system (GPS) coordinate of a wireless device associated with an individual. The individual can be identified by a telephone number, an account number, a social security number, a driver license number, a member number, a handle unique within a network, or some other identifier. The wireless device can be a cell phone, a digital assistant, a computer, a walkie-talkie, a vehicle, a satellite, or some other apparatus capable of sending or receiving wireless signals. The first individualized node of operation 130 can be the wireless device. Alternatively or additionally, the first individualized node can optionally perform operation 631, or can be coupled to the wireless device via a conduit, or can be close enough to the wireless device to enable the GPS coordinate of the wireless device to characterize the first location with adequate precision.

The device can be "associated" by making or using any selection of the individual for the device, or by making or using any selection of the device for the individual. A phone number can be associated with an individual, for example, by printing a directory, or by programming a switch to select a particular conduit or other device in response to receiving a call signal that includes the phone number. One skilled in the art will recognize these concepts and recognize many actions which create or maintain such associations.

The GPS can couple with an (or another) element of the wireless device via a conduit thereof, or can be remote from the wireless device, or can be distributed between the wireless device and some other device(s). Alternatively or additionally, the GPS signal can arrive from outside the network subsystem or even from outside the network. The signal strength indicator can be expressed conventionally in terms of decibels, as a simple integer such as a number of bars, as a Boolean value resulting from comparing a preliminary magnitude with a given threshold, or by some other convenient scalar, as one skilled in the art will recognize.

In some embodiments, node 570 is configured to perform flow 100. Operations 130 & 140 can each be performed by logic 538 or other circuitry 530, for example. Processor 534 can perform aggregating operation 150 by using each connectivity evaluation to modify a portion of mapping 562 that contains the location corresponding to the connectivity evaluation, for example. After finishing this modification for the first connectivity evaluation, for example, processor 534 can use the indicator of the second location and the second connectivity evaluation to modify a portion of mapping 562 that contains the second location.

Optional operation 633 includes using an identifier of one or more individuals associated with the first individualized node. Operation 633 can include circuitry 530 generating, transmitting, interpreting, recording, retrieving or otherwise acting on any personal, familial, corporate or other personal identifier having an association with the node, for example. The identifier may even be the only thing individualized about the node, for example, if the node (node 570, e.g.) includes a new general-purpose device having been configured for a particular user by storing a personal identifier (in SRAM 546, e.g.). Logic 538 or SRAM 546 can perform operation 633, for example.

Optional operation 635 includes measuring a strength of a signal received at the first individualized node. This can be performed by antenna 578 receiving the signal as an input 591 with circuitry 530 for comparing a reference voltage with a voltage received from antenna 578. Alternatively, logic 536 can sample a voltage received from antenna 578 and digitize the samples to generate the measured strength. Those skilled in the art can readily specify other suitable configurations for performing operation 635.

Optional operation 637 includes estimating an attribute of a signal received from the first individualized node. In some embodiments in relation to which node 588 is the "first" individualized node, or in which information about the first individualized node is received as input 591, an other node 570 can perform flow 100 substantially as described above. For example, logic 536 can comprise logic for estimating an attribute of input 591 such as a frequency, a phase, a strength, a time stamp, a directionality, an error rate, a signal-to-noise ratio, a destination location, an expected duration, a status, a confidence level, or any binary or other quantitative attribute that can be estimated.

Optional operation 652 includes generating the individualized mapping as a function of an identifier of a user or of an other individual, such as by processor 534 accessing mapping 562. The identifier may be included explicitly in a color-graphic mapping, for example, as a watermark overwriting a color of a pixel of the mapping. Alternatively or additionally, the identifier may be used to retrieve a mapping individualized by being at least partially stored within the first individualized node. A second individualized node of the same make and model as the first individualized node may request the connectivity-indicative mapping. Even though the mapping may not initially be individualized for the second individualized node, the mapping may be more effective than a generic mapping or no mapping for a user of the second individualized node. For example, the mapping may provide a suggestion of a location nearby at which the first individualized node was able to make a wireless link. The second individualized node may display an indication of such a received suggestion, optionally with an indication about a source of the suggestion. Red may indicate a measurement using the second individualized node, for example, in a map display that uses blue to indicate some other source.

Optional operation 654 includes generating the individualized mapping as a function of a serial number of the first individualized node, such as by processor 534. The serial number can include decimal or binary digits or other characters, optionally arranged to include a portion that defines a class and subclass of the individualized node. Such an arrangement may facilitate in an embodiment that makes some use of common characteristics. A first individualized node (node 570, e.g.) may be configured to indicate a first confidence range in mapping data obtained by another node (node 588, e.g.) having an antenna nominally identical with an antenna of the first individualized node. Connectivity-indicative mapping data of unknown or unrelated origin may correspond with a second, generally lower confidence range.

Optional operation 655 includes transmitting one or more messages depending on the first and second connectivity evaluations and on the first and second locations, such as by processor 534 or logic 536. The one or more messages can include a map, a portion of a map, a refinement for a map, for example, having a relationship to or utility for the connectivity-indicative mapping. Depending on the available computing resources and other attributes of the implementation context, the dependence may be very fine, such as by using the first connectivity evaluation to adapt a mapping of several cells near the first location. The dependence may also be very coarse, such as by ignoring the second connectivity evaluation if it indicates a connectivity within a broad range around a corresponding connectivity of the individualized connectivity-indicative mapping. A broad range, for example, may be defined as at most about two bars, for example.

Optional operation 656 includes generating the individualized connectivity-indicative mapping as a function of an account identifier, such as by processor 534 or logic 536. The account number may coincide with a number that a vendor, licensee, agent, or customer uses to categorize transactions with a given party or at a given location, for example.

Optional operation 658 includes receiving one or more messages that depend on the first and second connectivity evaluations and on the first and second locations. In an embodiment in which node 570 performs operation 150, for example, some component of node 570 (such as antenna 578) can perform operation 658 in lieu of node 570 generating connectivity evaluations or location indicators.

Turning now to FIG. 7, there is shown circuitry 730 operable to perform flow 100 of FIG. 1. Circuitry 730 includes memory 740, and optionally includes one or more of processor 734, logic 736, or logic 738. Memory 740 optionally includes one or more of register 743, register 744, SRAM 746, mapping 748, or storage 750. Storage 750 optionally includes one or more of code 756, code 758, or data 760. Data 760 optionally includes one or more of mapping 762 or mapping 764.

Circuitry 730 can optionally be implemented within node 770, which can include one or more of battery 776 or antenna 778. Antenna 778 may perform, or be operable to perform, receiving input 791 from external node 790 or transmitting output 792 to (or through) external node 790. Node 770 can optionally be included within network subsystem 780, which can include one or more of fuel supply 785 or node 788.

Turning now to FIG. 8, there are shown alternative embodiments of the example operational flow 100 of FIG. 1 or FIG. 6 that can be performed, for example, by network subsystem 780 of FIG. 7. FIG. 8 illustrates example embodiments where operation 130 or operation 150 of flow 100 may include one or more additional operations. Additional operations of operation 130 may include one or more of operation 834, operation 835, operation 837, or operation 838. Additional operations of operation 150 may include one or more of operation 852, operation 853, operation 856, or operation 859.

Optional operation 834 comprises obtaining the first connectivity evaluation by receiving an input from an other node. Antenna 778 can receive an input 791 from a source node that can be remote from network subsystem 780, such as a central server. Alternatively, in an embodiment in which node 770 is a host system with a docking capability, the "input from an other node" can be performed by processor 734 during a synch-up operation when node 788 docks with node 770.

The input can include the first connectivity evaluation, may instead include analog or digital data upon which the first connectivity evaluation can be calculated. In an embodiment in which processor 734 performs the operation 835 of requesting the input from the other node, for example, processor 734 can next initiate other circuitry 730 for measuring a bit error rate of the input. Processor 734 can then use the bit error rate as the connectivity evaluation, in that a higher bit error rate correlates with a lower connectivity.

Optional operation 837 comprises receiving the first connectivity evaluation from a second individualized node, such as by logic 738 receiving this information remotely from node 790. The second individualized node may receive the connectivity evaluation from a central or regional map server, for example, and may recognize from the individualized connectivity-indicative mapping that the mapping has not been individualized for the second individualized node. In this manner the second individualized node may serve as a relay or as a central or regional map server, for example. Alternatively or additionally, logic 738 may comprise logic for obtaining the first connectivity evaluation in an association with one or more coordinates by receiving the first connectivity evaluation from a second individualized node.

Optional operation 838 comprises obtaining the first connectivity evaluation in an association with one or more coordinates. Logic 738 may receive the one or more coordinates and the connectivity evaluation in the same received message, for example, and respond by storing these items within data 760. Responsive to this storage, or to some other event such as an interrupt, processor 734 can retrieve these stored items and use them to decide whether to update mapping 762 or mapping 764. In an embodiment in which a time stamp indicates that the connectivity evaluation is more than a given number of days old, for example, processor 734 may decide to discard the connectivity evaluation in lieu of using the connectivity evaluation to update any mapping. The evaluation can similarly be accompanied by a standard deviation, a confidence level, a source identification, or other indicator of a variability or reliability.

Optional operation 852 comprises generating the individualized connectivity-indicative mapping by adapting an other mapping. In the example above in which node 570 is a new general-purpose device, alternatively or additionally, memory 540 can initially be configured with a then-current default mapping for a given class of service and/or node hardware configuration. Node 570 can perform flow 100 to generate the individualized connectivity-indicative mapping 548 resident in local memory 540. Such an implementation can be advantageous over a one-size-fits-all mapping, for example, in that node 570 has a mapping at least partly based on a behavior of the specific components of node 570.

Optional operation 853 comprises adapting the other mapping within the first individualized node. Processor 734 can perform this operation, for example, to implement a desired arithmetic manipulation while maintaining a lower network or server loading. Alternatively or additionally, processor 734 can perform operation 856 of adapting the other mapping at least partly based on a measurement from an other node or operation 859 of including an indication of a date within the individualized connectivity-indicative mapping.

Turning now to FIG. 9, there are shown alternative embodiments of the example operational flow 100 of FIG. 1, FIG. 6, or FIG. 8 that can be performed, for example, by network subsystem 780 of FIG. 7. FIG. 9 illustrates example embodiments where operation 130 or operation 150 of flow 100 may include one or more additional operations. Additional operations of operation 130 may include one or more of operation 935, operation 936, or operation 937. Additional operations of operation 150 may include one or more of operation 952, operation 953, operation 954, operation 955, or operation 958.

Optional operation 935 comprises individualizing a mobile node to generate the first individualized node. Processor 734 can perform this, for example, by individualizing the mobile node by updating a table assigning an identifier to the mobile node (at operation 936, e.g.). Mapping 748 can contain the table, for example. Node 770 can be statically individualized, such as by hard-wiring or otherwise permanently affixing a serial number to the node or a device that interacts with the individualized node. Alternatively or additionally node 770 can be dynamically individualized, such as by creating or using a dynamic address or other temporary attribute effective for identifying node 770. Alternatively or additionally, processor 734 can perform operation 935 by providing a value uniquely identifying the first individualized node by an association with one member of a class (at operation 937, e.g.). The member can be an employee, a student, or subscriber, for example.

Optional operation 952 includes updating an other connectivity-indicative mapping. Circuitry 730 of FIG. 7 can perform operation 952, for example, by obtaining and then individualizing the other connectivity-indicative mapping to generate the individualized connectivity-indicative mapping (at operation 953, e.g.). In an embodiment in which node 770 is a mobile node, alternatively or additionally, a current draw on battery 776 can be kept low or reduced by having circuitry 730 perform operation 952, reducing the need for computations within node 770. Alternatively or additionally, node 770 may perform optional operation 954 of receiving the other connectivity-indicative mapping toward that same end.

In other embodiments, node 770 can be a central or regional server that performs aggregating operation 150 by generating the other connectivity-indicative mapping (at operation 955, e.g.) rather than receiving it. The mapping may be generated by being adapted from an initial form that is generic or not indicative of connectivity, alternatively or additionally, using data from the first individualized node (by operation 838, e.g.) or from similar nodes (by operation 837, e.g.). The server may then be modified by completing aggregating operation 150, such as by processor 734.

In one embodiment, node 770 provides a generic regional map that makes the "other" mapping available to each mobile node new to a given region. Later, node 770 can perform operations 130 & 140 to obtain at least first and second evaluations for the first individualized node (node 788, e.g.). Alternatively or additionally, node 770 can perform aggregating operation 150 by generating and storing one or more refinement records (by operation 958, e.g.), for example in mapping 764 of storage 750.

In still other embodiments, network subsystem 780 can be a motor-propelled vehicle or similar mechanism having a reasonably plentiful fuel supply 785 such as a fuel cell or gas tank. Even with such an ample power supply, transmission bandwidth may be limited or intermittently limited. In such a circumstance it can be useful to implement an embodiment such as node 570 receiving and storing one or more refinement records (by operation 958, e.g.) and to retrieve and process the records into a mapping 548 in memory 540 locally.

Turning now to FIG. 10, there are shown alternative embodiments of the example operational flow 100 of FIG. 1, FIG. 6, FIG. 8, or FIG. 9 that can be performed, for example, by network subsystem 780 of FIG. 7. FIG. 10 illustrates example embodiments where operation 130 or operation 150 of flow 100 may include one or more additional operations. Additional operations of operation 130 may include one or more of operation 1031, operation 1033, operation 1035, or operation 1037. Additional operations of operation 150 may include one or more of operation 1052, operation 1054, operation 1056, or operation 1058.

Optional operation 1031 comprises storing the first connectivity evaluation. In an embodiment in which node 770 performs flow 100, for example, processor 734 may place the first connectivity evaluation into register 743 and the indicator of the first location into register 744 before storing them as a part of data 760 (in a push operation, e.g.). Alternatively, or in preparation, logic 738 may be configured and used for receiving the first connectivity evaluation. In other embodiments, circuitry 730 may be configured and used for generating the first connectivity evaluation as a function of a measured magnitude of a received signal (at operation 1033, e.g.). The connectivity evaluation may optionally be stored as a part of a discrete refinement record stored in operation 958.

Optional operation 1035 comprises transmitting a request for a signal, and optional operation 1037 comprises measuring an amplitude of a response to the request. For example, antenna 778 may perform operation 1035 by sending output 791. In some embodiments, logic 738 may be configured and used for performing operation 1037 upon a response optionally received via the same antenna 778 that performed operation 1035.

Optional operation 1052 comprises retrieving at least a part of an other mapping within the first individualized node. For example, in an embodiment in which node 570 performs flow 100, circuitry 530 may be configured and used for retrieving part or all of a stored mapping 564 into a mapping 548 in memory 540. Optional operation 1054 comprises updating at least a part of the other mapping within the first individualized node. Processor 534 can update part or all of mapping 548, for example, responsive to evaluations obtained in operations 130 & 140.

In various embodiments described above in which node 770 performs operations 130, 140, and 150, circuitry 730 can optionally perform at least one of using a discrete refinement (in operation 1056, e.g.) or generating a discrete refinement (in operation 1058, e.g.). The refinement can previously or subsequently be placed in one or more refinement records in memory 740, such as by operation 958. The same refinement can be generated (in operation 1058, e.g.) before being used (in operation 1056, e.g.).

Turning now to FIG. 11, there are shown alternative embodiments of the example operational flow 100 of FIG. 1, FIG. 6, FIG. 8, FIG. 9, or FIG. 10 that can be performed, for example, by network subsystem 780 of FIG. 7. FIG. 11 illustrates example embodiments where operation 130 or operation 150 of flow 100 may include one or more additional operations. Additional operations of operation 130 may include one or more of operation 1131, operation 1136, operation 1137 or operation 1138. Additional operations of operation 150 may include one or more of operation 1152, operation 1153, operation 1154, operation 1156, or operation 1158.

Optional operation 1131 comprises computing the first connectivity evaluation at least partly based on a wireless signal. Operation 1131 can optionally begin by receiving the wireless signal at the first individualized node (at operation 1136, e.g.) or by receiving the wireless signal from an other node (at operation 1137, e.g.), or by receiving the wireless signal at a stationary node (at operation 1138, e.g.), for example. The wireless signal can be received through an antenna and used for charging one or more capacitors, for example, in a sampling circuit or as a representation of a wireless signal amplitude over an interval of time.

Alternatively or additionally, operation 1131 can include operation 1138 of receiving the wireless signal at a stationary node. The wireless signal can arrive directly (i.e., through only a free space or other passive medium) from the first individualized node, or it can arrive via one or more intermediaries such as a satellite, a passenger vehicle, or stationary relay. The wireless signal can directly embody an aspect of the connectivity, such as a signal amplitude, or can contain a message that an element of the stationary node (processor 734, e.g.) can use for generating the evaluation(s) and/or the aggregation.

The connectivity evaluation can optionally be performed by estimating a probability of a lost connection using empirical data with a given class of nodes, at a given location, with the use of one or more current measurements, by expressing an error rate, by expressing a latency, or by any of several other approaches effective for describing a connectivity.

Optional operation 1152 comprises generating the individualized connectivity-indicative mapping. In the embodiment just articulated, for example, processor 734 can perform operation 1152. The generating operation can be performed by individualizing a generic (non-individualized) mapping while using a discrete refinement (by operation 1056, e.g.) based on measurements at one or more locations of the first individualized node (such as node 570 or node 588, e.g.). This illustrates an example of optional operation 1153 of individualizing the connectivity-indicative mapping while updating the connectivity-indicative mapping.

Optional operation 1154 comprises generating the individualized mapping as a function of an identifier of a corporate entity. The identifier can be a partnership or corporate name, trademark, service mark, an Internet domain by the corporate entity, a tax identification number, a customer number, or an other alias used for identifying the entity, for example. Referring again to the embodiments of FIG. 1 & FIG. 2, for example, a node 200 is shown that can optionally be configured to perform flow 100 to include operation 1152. Logic 238 can individualize mapping 248 by encoding part or all of mapping 248, for example, using a key associated with one or more operands of the function. For example, any of the above corporate entity identifiers can serve as one of the arguments in a function call by a module of circuitry 230. Alternatively or additionally, a module of logic 238 can perform one or more of optional operation 1156 of generating the individualized mapping as a function of an account identifier or operation 1158 of generating the individualized mapping as a function of a serial number of the first individualized node.

In alternative embodiments, one or more instructions 320 of FIG. 3 are written as code 756 in memory 740 of node 770 of FIG. 7. Moreover one or more instructions 420 of FIG. 4 can be copied into code 758 in memory 740 of FIG. 7. Storage 750 can thus include a signal bearing medium bearing one or more of instruction(s) 321, instruction(s) 322, instruction(s) 323, instruction(s) 325, instruction(s) 327, instruction(s) 421, instruction(s) 422, instruction(s) 423, instruction(s) 425, or instruction(s) 426. One or more of these sets of instruction(s) can be used in one of the above-described embodiments in which node 770 can be the first individualized node.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Moreover, "can" and "optionally" and other permissive terms are used herein for describing optional features of various embodiments. These terms likewise describe selectable or configurable features generally, unless the context dictates otherwise.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interactable and/or logically interacting components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   receiving one or more generalized connectivity-indicative mappings established using one or more signal strength evaluations of one or more nodes other than and/or in addition to a first individualized node;
   receiving one or more signal strength connectivity evaluations associated with the first individualized node; and
   determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

2. The method of claim 1, wherein the receiving one or more signal strength connectivity evaluations associated with the first individualized node comprises:

receiving one or more signal strength connectivity evaluations associated with the first individualized node in association with one or more global positioning system (GPS) coordinates.

3. The method of claim 1, wherein the receiving one or more signal strength connectivity evaluations associated with the first individualized node comprises:
receiving one or more signal strength connectivity evaluations associated with the first individualized node in association with one or more identifiers of one or more individuals.

4. The method of claim 1, wherein the receiving one or more signal strength connectivity evaluations associated with the first individualized node comprises:
receiving one or more signal strength connectivity evaluations of one or more signals received at the first individualized node.

5. The method of claim 1, wherein the receiving one or more signal strength connectivity evaluations associated with the first individualized node comprises:
receiving one or more signal strength connectivity evaluations of one or more signals received from the first individualized node.

6. The method of claim 1, further comprising:
transmitting one or more messages depending upon at least one of the one or more signal strength connectivity evaluations.

7. The method of claim 1, further comprising:
receiving one or more messages that depend upon at least one of the one or more signal strength connectivity evaluations.

8. The method of claim 1, wherein the receiving one or more signal strength connectivity evaluations associated with the first individualized node comprises:
receiving from one or more nodes other than the first individualized node one or more signal strength connectivity evaluations associated with the first individualized node.

9. The method of claim 1, wherein the receiving one or more signal strength connectivity evaluations associated with the first individualized node comprises:
receiving one or more signal strength connectivity evaluations associated with the first individualized node in association with one or more coordinates.

10. The method of claim 1, wherein the receiving one or more signal strength connectivity evaluations associated with the first individualized node comprises:
receiving one or more signal strength connectivity evaluations associated with the first individualized node in association with input from one or more other nodes.

11. The method of claim 1, further comprising:
determining one or more dates associated with at least one of the one or more individualized connectivity-indicative mappings.

12. The method of claim 1, wherein the receiving one or more signal strength connectivity evaluations associated with the first individualized node comprises:
receiving one or more signal strength connectivity evaluations associated with the first individualized mobile node.

13. The method of claim 1, wherein the receiving one or more signal strength connectivity evaluations associated with the first individualized node comprises:
receiving one or more signal strength connectivity evaluations associated with the first individualized mobile node having one or more unique identifiers.

14. The method of claim 1, wherein the receiving one or more signal strength connectivity evaluations associated with the first individualized node comprises:
receiving one or more signal strength connectivity evaluations associated with the first individualized node having one or more unique identifiers.

15. The method of claim 1, further comprising:
updating at least one of the one or more generalized connectivity-indicative mappings.

16. The method of claim 1, further comprising:
updating at least one of the one or more generalized connectivity-indicative mappings; and
storing one or more refinement records.

17. The method of claim 1, further comprising:
storing at least one of the one or more signal strength connectivity evaluations.

18. The method of claim 1, wherein the receiving one or more signal strength connectivity evaluations associated with the first individualized node comprises:
receiving one or more signal strength connectivity evaluations including one or more measured signal magnitudes associated with the first individualized node.

19. The method of claim 1, further comprising:
transmitting one or more requests for one or more signals.

20. The method of claim 1, further comprising:
transmitting one or more requests for one or more signals; and
measuring one or more amplitudes of one or more responses to at least one of the one or more requests.

21. The method of claim 1, wherein the receiving one or more generalized connectivity-indicative mappings established using one or more signal strength evaluations of one or more nodes other than and/or in addition to a first individualized node comprises:
receiving by a first individualized node one or more generalized connectivity-indicative mappings established using one or more signal strength evaluations of one or more nodes other than and/or in addition to the first individualized node.

22. The method of claim 1, wherein the determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:
determining, using one or more processors, one or more individualized connectivity-indicative mappings associated with the first individualized node by discretely refining at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

23. The method of claim 1, wherein the receiving one or more signal strength connectivity evaluations associated with the first individualized node comprises:
receiving one or more signal strength connectivity evaluations based at least partly on one or more wireless signals associated with the first individualized node.

24. The method of claim 1, wherein the determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings and without modifying at least one of the one or more generalized connectivity-indicative mappings.

25. The method of claim 1, wherein the determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

determining, using one or more processors, in association with one or more account identifiers one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

26. The method of claim 1, wherein the determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

determining, using one or more processors, in association with one or more serial numbers one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

27. The method of claim 1, wherein the receiving one or more generalized connectivity-indicative mappings established using one or more signal strength evaluations of one or more nodes other than and/or in addition to a first individualized node comprises:

receiving one or more generalized connectivity-indicative mappings established using one or more signal strength evaluations of one or more similar nodes other than and/or in addition to a first individualized node.

28. The method of claim 1, wherein the receiving one or more generalized connectivity-indicative mappings established using one or more signal strength evaluations of one or more nodes other than and/or in addition to a first individualized node comprises:

receiving one or more generalized geographic location connectivity-indicative mappings established using one or more signal strength evaluations of one or more nodes other than and/or in addition to a first individualized node.

29. The method of claim 1, wherein the determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node upon the at least one of the one or more signal strength connectivity evaluations associated with the first individualized node being outside one or more ranges and while retaining at least one unaffected portion of at least one of the one or more generalized connectivity-indicative mappings.

30. The method of claim 1, further comprising:
determining for the first individualized node one or more proximate locations likely to have improved connectivity.

31. The method of claim 1, further comprising:
determining one or more refinements of at least one of the one or more individualized connectivity-indicative mappings.

32. The method of claim 1, wherein the receiving one or more signal strength connectivity evaluations associated with the first individualized node comprises:
receiving by the first individualized node one or more signal strength connectivity evaluations associated with the first individualized node.

33. The method of claim 1, wherein the determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

determining by the first individualized node, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

34. The method of claim 1, further comprising:
displaying at least one of the one or more individualized connectivity-indicative mappings as one or more geographic location maps having one or more boundary designations associated with one or more signal strength levels.

35. The method of claim 1, further comprising:
displaying at least one of the one or more individualized connectivity-indicative mappings as one or more geographic location maps having one or more boundary designations associated with one or more signal strength levels associated with the first individualized node that supplement one or more boundary designations associated with one or more signal strength levels associated with at least one of the one or more nodes other than and/or in addition to the first individualized node.

36. The method of claim 1 wherein the determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:
determining, using one or more processors, one or more individualized connectivity-indicative mappings associated with the first individualized node by updating at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

37. The method of claim 1, further comprising:
transmitting one or more results to the first individualized node.

38. A system comprising:
means for receiving one or more generalized connectivity-indicative mappings established using one or more signal strength evaluations of one or more nodes other than and/or in addition to a first individualized node;
means for receiving one or more signal strength connectivity evaluations associated with the first individualized node; and
means for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

39. One or more non-transitory computer readable media bearing one or more device detectable instructions for facilitating operations comprising:
receiving one or more generalized connectivity-indicative mappings established using one or more signal strength evaluations of one or more nodes other than and/or in addition to a first individualized node;
receiving one or more signal strength connectivity evaluations associated with the first individualized node; and
determining, using one or more processors, one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

40. A system comprising:
circuitry for receiving one or more generalized connectivity-indicative mappings established using one or more signal strength evaluations of one or more nodes other than and/or in addition to a first individualized node;
circuitry for receiving one or more signal strength connectivity evaluations associated with the first individualized node; and
circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

41. The system of claim 40, wherein circuitry for the receiving one or more signal strength connectivity evaluations associated with the first individualized node comprises:
circuitry for receiving one or more signal strength connectivity evaluations associated with the first individualized node in association with one or more global positioning system (GPS) coordinates.

42. The system of claim 40, wherein the circuitry for receiving one or more signal strength connectivity evaluations associated with the first individualized node comprises:
circuitry for receiving one or more signal strength connectivity evaluations associated with the first individualized node in association with one or more identifiers of one or more individuals.

43. The system of claim 40, wherein circuitry for the receiving one or more signal strength connectivity evaluations associated with the first individualized node comprises:
circuitry for receiving one or more signal strength connectivity evaluations of one or more signals received at the first individualized node.

44. The system of claim 40, wherein the circuitry for receiving one or more signal strength connectivity evaluations associated with the first individualized node comprises:
circuitry for receiving one or more signal strength connectivity evaluations of one or more signals received from the first individualized node.

45. The system of claim 40, further comprising:
circuitry for transmitting one or more messages depending upon at least one of the one or more signal strength connectivity evaluations.

46. The system of claim 40, further comprising:
circuitry for receiving one or more messages that depend upon at least one of the one or more signal strength connectivity evaluations.

47. The system of claim 40, wherein the circuitry for receiving one or more signal strength connectivity evaluations associated with the first individualized node comprises:
circuitry for receiving from one or more nodes other than the first individualized node one or more signal strength connectivity evaluations associated with the first individualized node.

48. The system of claim 40, wherein the circuitry for receiving one or more signal strength connectivity evaluations associated with the first individualized node comprises:
   circuitry for receiving one or more signal strength connectivity evaluations associated with the first individualized node in association with one or more coordinates.

49. The system of claim 40, wherein the circuitry for receiving one or more signal strength connectivity evaluations associated with the first individualized node comprises:
   circuitry for receiving one or more signal strength connectivity evaluations associated with the first individualized node in association with input from one or more other nodes.

50. The system of claim 40, further comprising:
   circuitry for determining one or more dates associated with at least one of the one or more individualized connectivity-indicative mappings.

51. The system of claim 40, wherein the circuitry for receiving one or more signal strength connectivity evaluations associated with the first individualized node comprises:
   circuitry for receiving one or more signal strength connectivity evaluations associated with the first individualized mobile node.

52. The system of claim 40, wherein the circuitry for receiving one or more signal strength connectivity evaluations associated with the first individualized node comprises:
   circuitry for receiving one or more signal strength connectivity evaluations associated with the first individualized mobile node having one or more unique identifiers.

53. The system of claim 40, wherein the circuitry for receiving one or more signal strength connectivity evaluations associated with the first individualized node comprises:
   circuitry for receiving one or more signal strength connectivity evaluations associated with the first individualized node having one or more unique identifiers.

54. The system of claim 40, further comprising:
   circuitry for updating at least one of the one or more generalized connectivity-indicative mappings.

55. The system of claim 40, further comprising:
   circuitry for updating at least one of the one or more generalized connectivity-indicative mappings; and
   circuitry for storing one or more refinement records.

56. The system of claim 40, further comprising:
   circuitry for storing at least one of the one or more signal strength connectivity evaluations.

57. The system of claim 40, wherein the circuitry for receiving one or more signal strength connectivity evaluations associated with the first individualized node comprises:
   circuitry for receiving one or more signal strength connectivity evaluations including one or more measured signal magnitudes associated with the first individualized node.

58. The system of claim 40, further comprising:
   circuitry for transmitting one or more requests for one or more signals.

59. The system of claim 40, further comprising:
   circuitry for transmitting one or more requests for one or more signals; and
   circuitry for measuring one or more amplitudes of one or more responses to at least one of the one or more requests.

60. The system of claim 40, wherein the circuitry for receiving one or more generalized connectivity-indicative mappings established using one or more signal strength evaluations of one or more nodes other than and/or in addition to a first individualized node comprises:
   circuitry for receiving by a first individualized node one or more generalized connectivity-indicative mappings established using one or more signal strength evaluations of one or more nodes other than and/or in addition to the first individualized node.

61. The system of claim 40, wherein the circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:
   circuitry for determining one or more individualized connectivity-indicative mappings associated with the first individualized node by discretely refining at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

62. The system of claim 40, wherein the circuitry for receiving one or more signal strength connectivity evaluations associated with the first individualized node comprises:
   circuitry for receiving one or more signal strength connectivity evaluations based at least partly on one or more wireless signals associated with the first individualized node.

63. The system of claim 40, wherein the circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:
   circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings and without modifying at least one of the one or more generalized connectivity-indicative mappings.

64. The system of claim 40, wherein the circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:
   circuitry for determining in association with one or more account identifiers one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

65. The system of claim 40, wherein the circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

circuitry for determining in association with one or more serial numbers one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

66. The system of claim 40, wherein the circuitry for receiving one or more generalized connectivity-indicative mappings established using one or more signal strength evaluations of one or more nodes other than and/or in addition to a first individualized node comprises:

circuitry for receiving one or more generalized connectivity-indicative mappings established using one or more signal strength evaluations of one or more similar nodes other than and/or in addition to a first individualized node.

67. The system of claim 40, wherein the circuitry for receiving one or more generalized connectivity-indicative mappings established using one or more signal strength evaluations of one or more nodes other than and/or in addition to a first individualized node comprises:

circuitry for receiving one or more generalized geographic location connectivity-indicative mappings established using one or more signal strength evaluations of one or more nodes other than and/or in addition to a first individualized node.

68. The system of claim 40, wherein the circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node upon the at least one of the one or more signal strength connectivity evaluations associated with the first individualized node being outside one or more ranges and while retaining at least one unaffected portion of at least one of the one or more generalized connectivity-indicative mappings.

69. The system of claim 40, further comprising:

circuitry for determining for the first individualized node one or more proximate locations likely to have improved connectivity.

70. The system of claim 40, further comprising:

circuitry for determining one or more refinements of at least one of the one or more individualized connectivity-indicative mappings.

71. The system of claim 40, wherein the circuitry for receiving one or more signal strength connectivity evaluations associated with the first individualized node comprises:

circuitry for receiving by the first individualized node one or more signal strength connectivity evaluations associated with the first individualized node.

72. The system of claim 40, wherein the circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

circuitry for determining by the first individualized node one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

73. The system of claim 40, further comprising:

circuitry for displaying at least one of the one or more individualized connectivity-indicative mappings as one or more geographic location maps having one or more boundary designations associated with one or more signal strength levels.

74. The system of claim 40, further comprising:

circuitry for displaying at least one of the one or more individualized connectivity-indicative mappings as one or more geographic location maps having one or more boundary designations associated with one or more signal strength levels associated with the first individualized node that supplement one or more boundary designations associated with one or more signal strength levels associated with at least one of the one or more nodes other than and/or in addition to the first individualized node.

75. The system of claim 40 wherein the circuitry for determining one or more individualized connectivity-indicative mappings associated with the first individualized node by adapting at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings comprises:

circuitry for determining one or more individualized connectivity-indicative mappings associated with the first individualized node by updating at least one of the one or more generalized connectivity-indicative mappings to reflect at least one of the one or more signal strength connectivity evaluations associated with the first individualized node while retaining at least one unaffected portion of at least one of the one or more generalized connectivity-indicative mappings.

76. The system of claim 40, further comprising:

circuitry for transmitting one or more results to the first individualized node.

\* \* \* \* \*